United States Patent
Cho et al.

(10) Patent No.: US 7,240,504 B2
(45) Date of Patent: Jul. 10, 2007

(54) COGENERATION SYSTEM

(75) Inventors: Eun Jun Cho, Kimpo-si (KR); Yun Ho Ryu, Seoul (KR); Young Seob Choi, Seoul (KR); Baik Young Cheong, Inchun-si (KR); Jae Won Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 157 days.

(21) Appl. No.: 11/046,685

(22) Filed: Feb. 1, 2005

(65) Prior Publication Data

US 2006/0037344 A1    Feb. 23, 2006

(30) Foreign Application Priority Data

Aug. 17, 2004   (KR) ................ 10-2004-0064807

(51) Int. Cl.
    *F25B 27/02*    (2006.01)
(52) U.S. Cl. .................................... 62/238.7
(58) Field of Classification Search ..... 62/238.6–238.7
    See application file for complete search history.

(56) References Cited

U.S. PATENT DOCUMENTS

| | | | | |
|---|---|---|---|---|
| 6,460,360 B2 * | 10/2002 | Hsieh | ................ | 62/238.1 |
| 6,543,531 B1 * | 4/2003 | Casar et al. | ................ | 165/202 |
| 6,735,969 B2 * | 5/2004 | Kasagi et al. | ................ | 62/238.7 |
| 6,769,481 B2 * | 8/2004 | Yoshimura et al. | ......... | 165/240 |
| 6,843,312 B2 * | 1/2005 | Burk et al. | ................ | 165/240 |
| 6,883,342 B2 * | 4/2005 | Kato et al. | ................ | 62/238.7 |

* cited by examiner

*Primary Examiner*—William E. Tapolcai
(74) *Attorney, Agent, or Firm*—Birch, Stewart, Kolasch & Birch, LLP

(57) ABSTRACT

A cogeneration system including an engine, which drives a generator to generate electricity, a cooling/heating unit, which comprises at least one compressor, a four-way valve, an outdoor heat exchanger, an expansion device, and an indoor heat exchanger, to establish a heat pump type refrigerant cycle, and an exhaust heat consuming heating unit to supply heat of exhaust gas discharged from the engine to a heat exchanging zone of the indoor heat exchanger of the cooling/heating unit, and thus, to heat a confined space. Since waste heat generated from the engine is directly used in the cooling/heating unit, an enhancement in indoor heating efficiency is achieved.

16 Claims, 4 Drawing Sheets

COGENERATION SYSTEM

BACKGROUND OF THE INVENTION

1. Field of the Invention

The present invention relates to a cogeneration system in which both the electricity and waste heat generated from an engine are used, and, more particularly, to a cogeneration system in which waste heat generated from an engine is supplied to a heat exchanging zone of an indoor heat exchanger to achieve a heating operation.

2. Description of the Related Art

In general, cogeneration systems are adapted to generate both electricity and heat from a single energy source.

Such a cogeneration system can recover heat of exhaust gas or waste heat of cooling water generated from an engine or turbine during an electricity generation operation, so that the cogeneration system can achieve an increase in energy efficiency of 70 to 80% over other systems. By virtue of such an advantage, the cogeneration system has recently been highlighted as an electricity and heat supply source for buildings. In particular, the cogeneration system exhibits highly-efficient energy utilization in that the recovered waste heat is mainly used to heat/cool a confined space and to heat water.

FIG. 1 is a schematic configuration diagram illustrating a conventional cogeneration system used in a heating/cooling apparatus.

As shown in FIG. 1, the conventional cogeneration system includes a gas engine 1, and a generator 3, which is driven by a driving force outputted from the gas engine 1, to generate electricity. The electricity generated from the generator 3 is used in a variety of devices including a cooling/heating unit 20, illumination devices, and other electrical products.

In the cogeneration system, waste heat generated from the gas engine 1, that is, heat of cooling water generated when the cooling water cools the gas engine 1, and heat of exhaust gas generated from the gas engine 1, is used during a heating operation of the cooling/heating unit 20.

Here, the cooling/heating unit 20 is of a heat pump type so that the cooling/heating unit 20 not only can be used as a cooling unit, but also can be used as a heating unit in a state in which the refrigerant flow direction in the refrigerant cycle is reversed. As in a general heat pump type configuration, the cooling/heating unit 20 includes a compressor 21, a four-way valve 23, an outdoor heat exchanger 25, an outdoor fan 26, an expansion device 27, and an indoor heat exchanger 29.

In particular, an air pre-heating heat exchanger 30 is arranged at the side of the outdoor heat exchanger 25 to preheat air passing around the outdoor heat exchanger 25 during a heating operation of the cooling/heating unit 20, using the waste heat of the gas engine 1.

In order to supply the waste heat to the cooling/heating unit 20, the cogeneration system also includes a cooling water heat exchanger 5 to recover the heat of the cooling water used to cool the gas engine 1, and an exhaust gas heat exchanger 9 arranged at an exhaust conduit 7 to recover the heat of the exhaust gas.

The cooling water heat exchanger 5 and exhaust gas heat exchanger 9 are connected to the air pre-heating heat exchanger 30 of the cooling/heating unit 20 by a heat transfer line 11, through which a heat transfer medium flows, so as to supply waste heat to the air pre-heating heat exchanger 30 during the heating operation of the cooling/heating unit 20. Thus, the cogeneration system recovers engine heat and exhaust gas heat, pre-heats outdoor air through the air pre-heating heat exchanger 30, using the recovered heat, and causes the pre-heated air to perform heat exchange with the outdoor heat exchanger 25, thereby preventing a degradation in the heating performance of the cooling/heating unit 20, which may occur when the temperature of the outdoor air is low.

When the cooling/heating unit 20 operates in a cooling mode, the flow path of the heat transfer medium is changed to communicate with a radiating line 13, which is connected to the heat transfer line 11, because it is unnecessary to supply waste heat. In this case, the waste heat is discharged to the atmosphere through a radiator 17, which includes a heat exchanger 15 and a radiator fan 16, or is supplied to and used in a water heater, a hot water supplier, or other systems.

In FIG. 1, reference character P designates pumps, each serving to force the heat transfer medium to flow through an associated portion of the heat transfer line 11, and reference character V designates valves, each serving to switch the flow path of the heat transfer medium between the heat transfer line 11 and the radiating line 13.

Although the waste heat generated from the gas engine 1 is used to pre-heat the outdoor heat exchanger 25 through the air pre-heating heat exchanger 30, the conventional cogeneration system has a problem in that a degradation in energy efficiency occurs because the waste heat is not directly used to heat a confined space.

SUMMARY OF THE INVENTION

The present invention has been made in view of the above-mentioned problem, and it is an object of the invention to provide a cogeneration system in which waste heat generated from an engine is directly supplied to a fluid line connected to an indoor heat exchanger so that the waste heat is used to heat a confined space, thereby achieving an enhancement in heating efficiency.

Another object of the invention is to provide a cogeneration system in which waste heat generated from an engine is used to pre-heat a refrigerant passing through a suction line of a compressor, so that it is possible to prevent a degradation in heating performance during operation of a refrigerant cycle.

In accordance with one aspect, the present invention provides a cogeneration system comprising: an engine, which drives a generator to generate electricity; a cooling/heating unit, which comprises at least one compressor, a four-way valve, an outdoor heat exchanger, an expansion device, and an indoor heat exchanger, to establish a heat pump type refrigerant cycle; and an exhaust heat consuming heating unit to supply heat of exhaust gas discharged from the engine to a heat exchanging zone of the indoor heat exchanger of the cooling/heating unit, and thus, to heat a confined space.

The exhaust heat consuming heating unit may comprise an exhaust gas heat exchanger arranged at an exhaust conduit, through which the exhaust gas passes, an indoor heater arranged at the heat exchanging zone of the indoor heat exchanger to perform heat exchange with indoor air, and a heating line, which connects the exhaust gas heat exchanger and the indoor heater to guide a heat transfer medium to flow between the exhaust gas heat exchanger and the indoor heater.

The exhaust heat consuming heating unit may further comprise an exhaust heat radiating unit to radiate heat recovered by the exhaust gas heat exchanger when it is unnecessary to supply heat to the indoor heater.

The exhaust heat radiating unit may comprise a radiating line branched from the heating line, a valve to bypass the heat transfer medium in the heating line through the radiating line, and a radiator arranged at the radiating line.

The indoor heater may be arranged in parallel with the indoor heat exchanger such that the indoor heater performs the heat exchange with the indoor air in accordance with an operation of an indoor fan.

The indoor heater may be arranged downstream from the indoor heat exchanger with respect to a flowing direction of the indoor air.

The cogeneration system may further comprise a refrigerant pre-heating unit to supply heat of cooling water used to cool the engine to a suction side of the compressor of the cooling/heating unit, and thus, to pre-heat a refrigerant passing through the suction side of the compressor.

The refrigerant pre-heating unit may comprise a cooling water line, through which the cooling water of the engine passes, and a cooling water heat exchanger to recover heat of the cooling water in the cooling water line, and to transfer the recovered heat to a refrigerant line connected to a suction section of the compressor.

The refrigerant pre-heating unit may further comprise a refrigerant pre-heating heat exchanger arranged between the cooling water heat exchanger and the refrigerant line connected to the suction section of the compressor, to indirectly transfer the heat recovered by the cooling water heat exchanger to the refrigerant line connected to the suction section of the compressor.

The cogeneration system may further comprise a refrigerant bypass line branched from the refrigerant line connected to the suction section of the compressor to allow the refrigerant in the refrigerant line to bypass the refrigerant pre-heating unit during a cooling operation of the cooling/heating unit.

The cogeneration system may further comprise a cooling water heat radiating unit arranged at the cooling water line to radiate the heat of the cooling water when it is unnecessary to supply heat to the suction side of the compressor.

In accordance with another aspect, the present invention provides a cogeneration system comprising: an engine, which drives a generator to generate electricity; a cooling/heating unit, which comprises at least one compressor, a four-way valve, an outdoor heat exchanger, an expansion device, and an indoor heat exchanger, to establish a heat pump type refrigerant cycle; and an indoor heating unit to supply heat of exhaust gas discharged from the engine or heat of cooling water used to cool the engine to a heat exchanging zone of the indoor heat exchanger of the cooling/heating unit, and thus, to heat a confined space.

The cogeneration system of the present invention can achieve an enhancement in indoor heating efficiency because the cogeneration system includes the indoor heater to heat air blown to the indoor heat exchanger, using waste heat generated from an engine.

Since the indoor heater is arranged downstream from the indoor heat exchanger, the cogeneration system of the present invention also has an effect of preventing the refrigerant of the cooling/heating unit from being rapidly degraded.

In addition, the cogeneration system of the present invention achieves an improvement in heating performance because it is possible to pre-heat the refrigerant passing through the suction side of the compressor, using the waste heat generated from the engine, and thus, to increase the temperature of the temperature.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Hereinafter, exemplary embodiments of a cogeneration system according to the present invention will be described with reference to the annexed drawings.

Although a number of embodiments may be implemented for the cogeneration system according to the present invention, the following description will be given in conjunction with the most preferable embodiment. Since the basic configuration of the cogeneration system is the same as that of the conventional cogeneration system, no detailed description thereof will be given.

Figure 1:
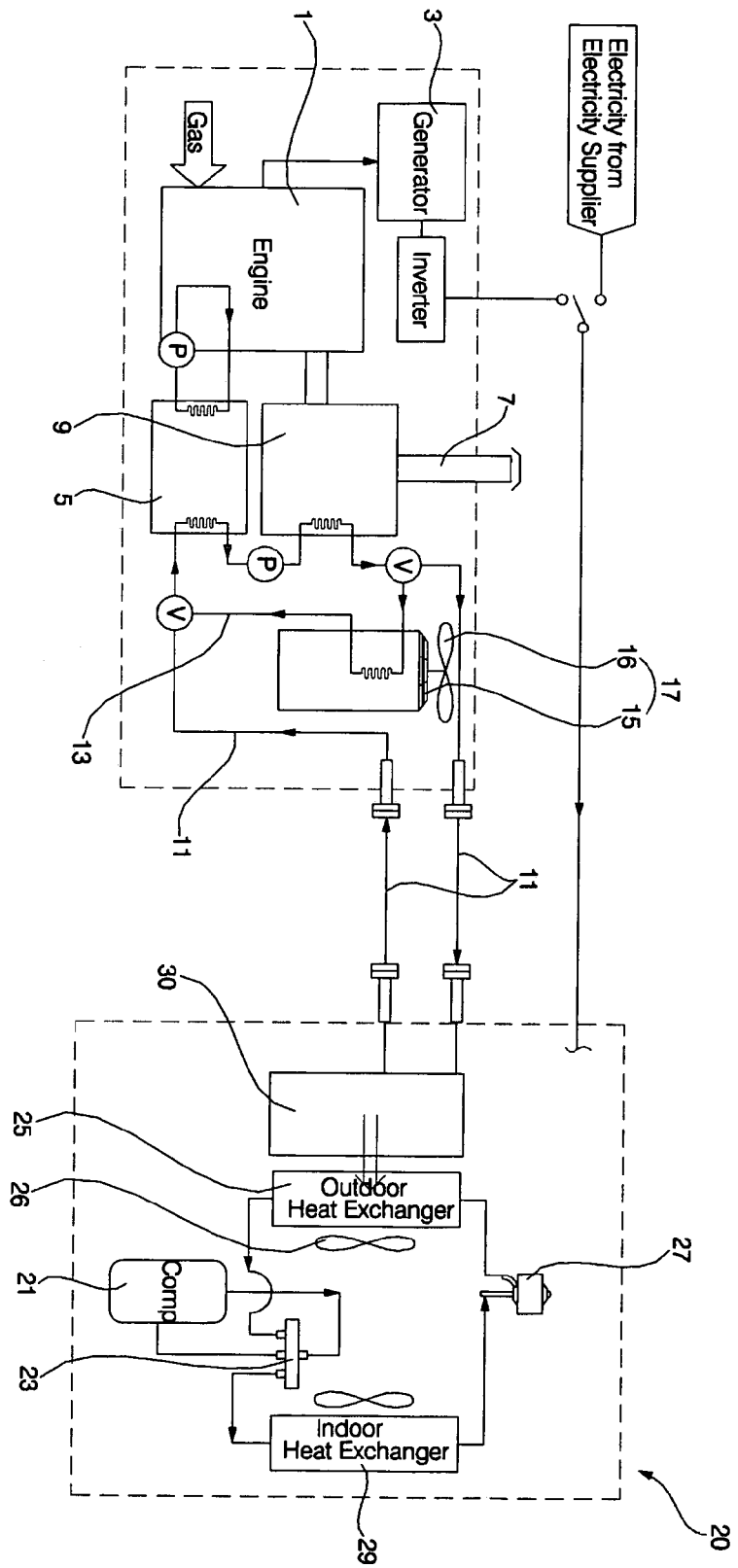
FIG. 1 is a schematic configuration diagram illustrating a conventional cogeneration system.
Figure 2:
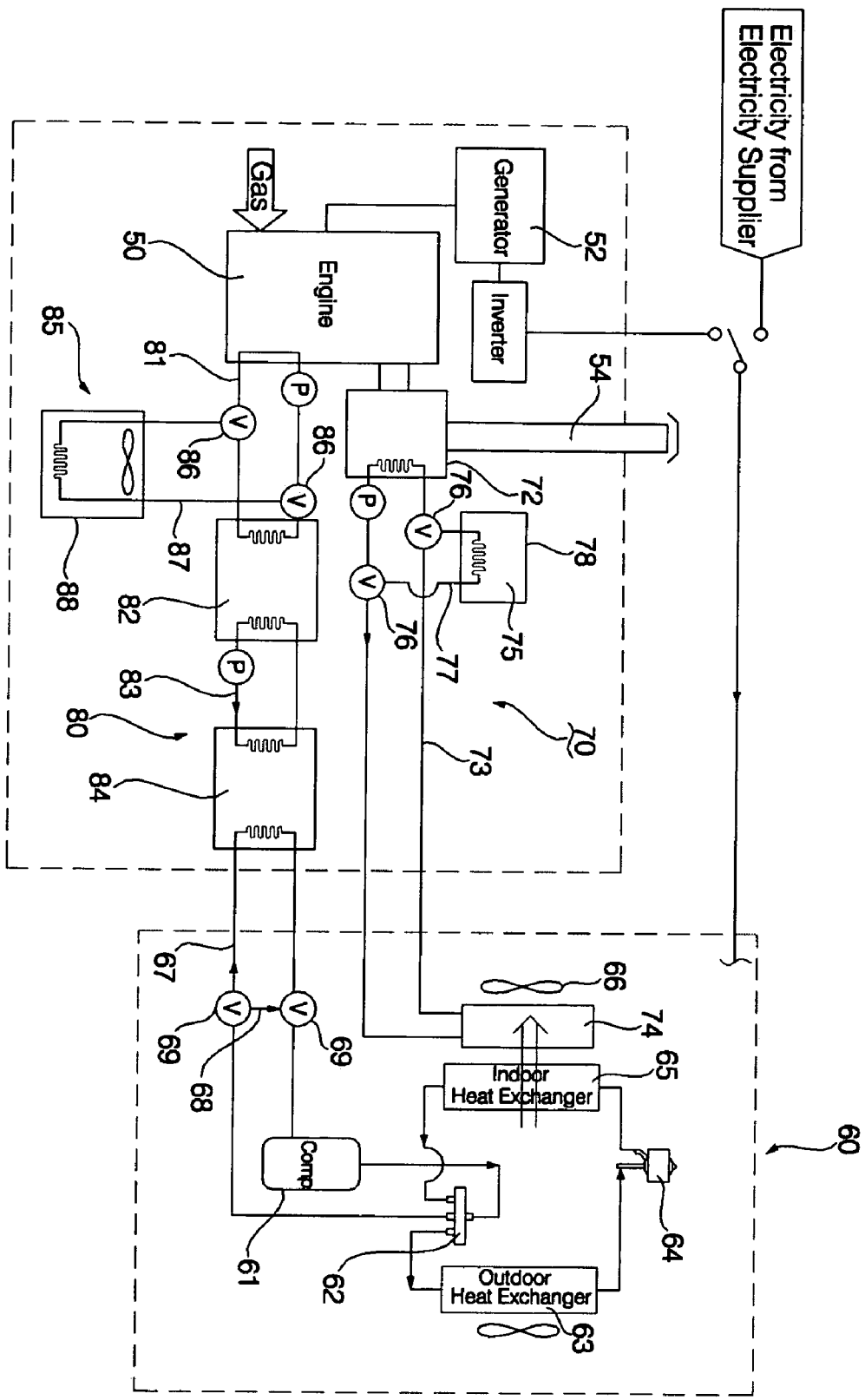
FIG. 2 is a schematic configuration diagram illustrating a cogeneration system according to an exemplary embodiment of the present invention.

FIG. 2 is a schematic configuration diagram illustrating a cogeneration system according to an exemplary embodiment of the present invention.

As shown in FIG. 2, the cogeneration system includes an engine 50, which operates, using fossil fuel such as natural gas or petroleum gas, a generator 52 to generate electricity, using a driving force of the engine 50, an exhaust gas heat exchanger 72 to recover heat of exhaust gas of the engine 50, a cooling water heat exchanger 82 to recover heat of cooling water of the engine 50, and radiators 78 and 88 to radiate the exhaust gas heat and cooling water heat, respectively.

The cogeneration system also includes a cooling/heating unit 60, which uses a heat pump type refrigerant cycle using waste heat generated from the engine 50. The cooling/heating unit 60 includes at least one compressor 61, a four-way valve 62, an outdoor heat exchanger 63, an expansion device 64, an indoor heat exchanger 65, and an indoor fan 66, as in a general heat pump type cooling/heating unit, which can be used as both a cooling unit and a heating unit in accordance with reversal of a refrigerant flow in a refrigerant cycle of the cooling/heating unit.

In particular, an exhaust heat consuming heating unit 70 is connected to the cooling/heating unit 60. The exhaust heat consuming heating unit 70 supplies the heat of the exhaust gas discharged from the engine 50 to a heat exchanging zone of the indoor heat exchanger 65, and thus, to heat a confined space.

The exhaust gas heat exchanger 72 is included in the exhaust heat consuming heating unit 70. The exhaust gas heat exchanger 72 is arranged at an exhaust conduit 54, which discharges the exhaust gas of the engine 50. In addition to the exhaust gas heat exchanger 72, the exhaust heat consuming heating unit 70 includes an indoor heater 74 arranged at the heat exchanging zone of the indoor heat exchanger 65, to perform heat exchange with indoor air, and a heating line 73, which connects the exhaust gas heat exchanger 72 and indoor heater 74 to guide a heat transfer medium, for example, liquid, to flow between the exhaust gas heat exchanger 72 and the indoor heater 74.

Preferably, the indoor heater 74 is configured such that the heat transfer medium, for example, liquid, which passes through the interior of the indoor heater 74, performs heat exchange with air, which passes around the indoor heater 74, as in a general air cooled type heat exchanger. The indoor heater 74 is arranged in parallel with the indoor heat exchanger 65 so that the indoor heater 74 performs heat exchange with indoor air in accordance with operation of an indoor fan 66. The indoor heater 74 is arranged between the indoor heat exchanger 65 and the indoor fan 66, downstream from the indoor heat exchanger 65 with respect to a flowing direction of indoor air.

The exhaust heat consuming heating unit 70 further includes an exhaust heat radiating unit 75 to radiate the heat recovered through the exhaust gas heat exchanger 72 to the atmosphere when it is necessary to prevent heat from being supplied to the indoor heater 74, as in a cooling operation of the cooling/heating unit 60. The exhaust heat radiating unit 75 includes a radiating line 77 branched from the heating line 73, valves 76 respectively arranged at opposite ends of the radiating line 77, and a radiator 78 arranged at the radiating line 77.

Preferably, each valve 76 is a solenoid type three-way valve, which operates to change a fluid path between the heating line 73 and the radiating line 77 under the control of a control means included in the cogeneration system. The radiator 78 may be of an air cooled type such that the radiator 78 radiates heat to the atmosphere. Alternatively, the radiator 78 may take the form of a heat exchanger configured to heat water or to supply hot water.

In FIG. 2, reference character P designates pumps, each serving to force the heat transfer medium to flow through an associated line.

The cogeneration system according to this embodiment further includes a refrigerant pre-heating unit 80 to supply heat of the cooling water used to cool the engine 50 to a suction-side refrigerant line 67 of the compressor 61 in the cooling/heating unit 60, and thus, to pre-heat a refrigerant passing through the refrigerant line 67.

The refrigerant pre-heating unit 80 includes a cooling water line 81, through which the cooling water of the engine 50 passes, and a cooling water heat exchanger 82 to recover cooling water heat from the cooling water line 81, and to transfer the recovered heat to the refrigerant line 67 connected to a suction section of the compressor 61.

A refrigerant pre-heating heat exchanger 84 is arranged between a heat exchanging line 63 connected to the cooling water heat exchanger 82 and a refrigerant line 67 connected to the suction section of the compressor 61, to indirectly transfer the heat recovered by the cooling water heat exchanger 82 to the compressor suction-side refrigerant line 67.

That is, the refrigerant pre-heating heat exchanger 84 is configured to achieve heat exchange between the heat exchanging line 83 connected to the cooling water heat exchanger 82 and the refrigerant line 67.

A refrigerant bypass line 68 is branched from the refrigerant line 67 connected to the suction section of the compressor 61. Valves 69 are arranged at opposite ends of the refrigerant bypass line 68 to change a refrigerant path between the refrigerant line 67 and the refrigerant bypass line 68, respectively. The refrigerant bypass line 68 and valves 69 serve to cause the refrigerant passing through the refrigerant line 67 to bypass the refrigerant pre-heating unit 80 during the cooling operation of the cooling/heating unit 60.

Preferably, each valve 69 has the same function as the valves 76 of the exhaust heat radiating unit 75.

A cooling water heat radiating unit 85 is arranged at the cooling water line 81 to radiate the heat of the cooling water when it is unnecessary to supply heat to the suction side of the compressor 61, as in the cooling operation of the cooling/heating unit 60.

In order to radiate the heat of the cooling water to the atmosphere, the cooling water heat radiating unit 85 includes a radiating line 87 branched from the cooling water line 81, valves 86 respectively arranged at opposite ends of the radiating line 87 to bypass the cooling water in the cooling water line 81 through the radiating line 87, and a radiator 88 arranged at the radiating line 87. The radiator 88 may be connected to other systems to use the waste heat of the cooling water, as in the above-described case in which the heat of the exhaust gas is used to heat water or to supply hot water.

Since the cogeneration system of this embodiment includes several heat exchangers including the exhaust gas heat exchanger 72, cooling water heat exchanger 82, refrigerant pre-heating heat exchanger 84, and indoor heater 74, it is possible to operate a water heater or other heat consumers even during a heating operation, by appropriately implementing a water-heating heat exchanger or a water-heating vessel having a heat exchanging function, which receive heat from the above heat exchangers, in accordance with the given design condition.

Figure 3:
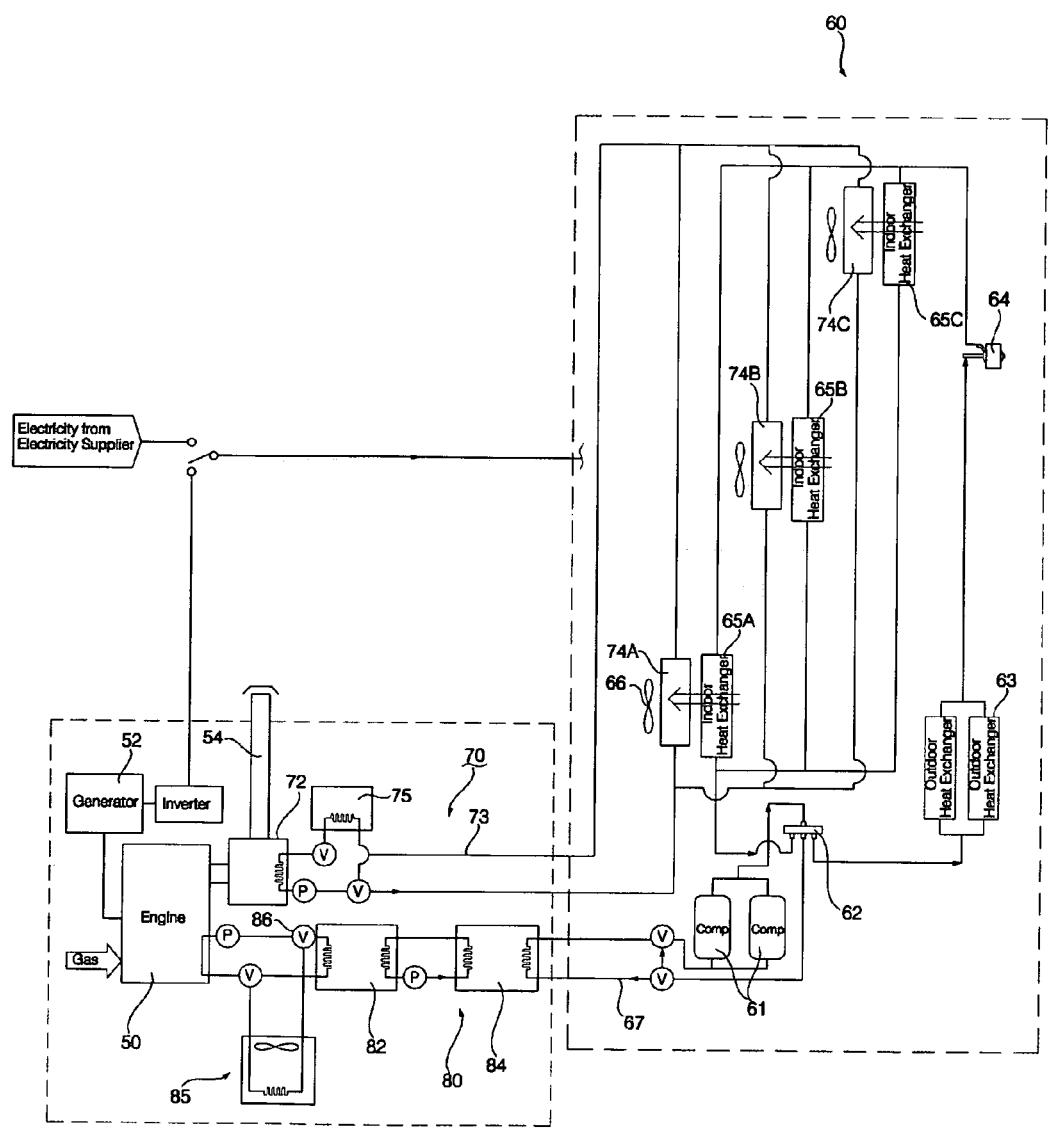
FIG. 3 is a schematic configuration diagram illustrating a cogeneration system according to another exemplary embodiment of the present invention in which a plurality of indoor heat exchangers are used.

On the other hand, FIG. 3 is a schematic configuration diagram illustrating a cogeneration system according to another exemplary embodiment of the present invention in which a plurality of indoor heat exchangers are used. In this case, a plurality of indoor heat exchangers 65A, 65B, and 65C are arranged in serial or parallel in a single cooling/heating unit 60 to cool/heat a plurality of confined spaces, respectively. In this case, a plurality of indoor heaters 74A, 74B, and 74C respective corresponding to the indoor heat exchangers 65A, 65B, and 65C are included in an exhaust heat consuming heating unit 70.

The indoor heaters 74A, 74B, and 74C may have various arrangements, for example, a serial or parallel arrangement, on a heating line 73 in accordance with the given design condition. Also, the indoor heaters 74A, 74B, and 74C may be selectively arranged only for a required one or ones of the indoor heat exchangers 74A, 74B, and 74C.

It is also possible to use a plurality of compressors 61 and/or a plurality of outdoor heat exchangers 63.

Constituent elements of the configuration of FIG. 3 corresponding to those of FIG. 2 are designated by the same reference numerals, respectively, and no description thereof will be given. Similarly, constituent elements of the configuration of FIG. 4, which will be described hereinafter, corresponding to those of FIG. 2 are designated by the same reference numerals, respectively, and no description thereof will be given.

Figure 4:
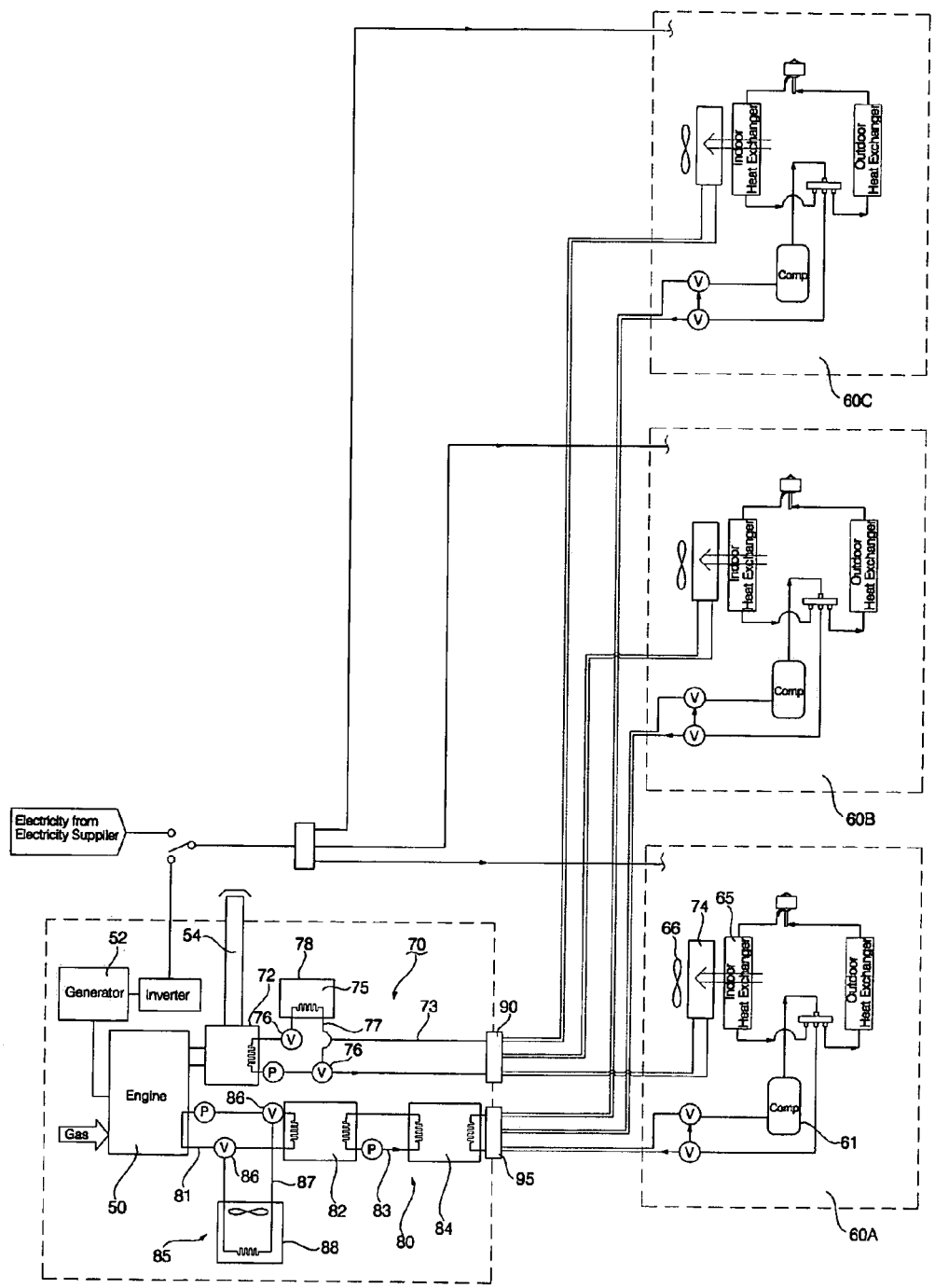
FIG. 4 is a schematic configuration diagram illustrating a cogeneration system according to another exemplary embodiment of the present invention in which a plurality of cooling/heating units are used.

FIG. 4 is a schematic configuration diagram illustrating a cogeneration system according to another exemplary embodiment of the present invention in which a plurality of cooling/heating units are used. In this case, distributors 90 and 95 are arranged at a heating line 73 connected to an exhaust heat consuming heating unit 70 and a refrigerant line 67 connected to a refrigerant pre-heating unit 80, respectively, to distribute heat to a plurality of cooling/heating units 60A, 60B, and 60C.

Alternatively, the distributors 90 and 95 may be arranged at the heat exchanging line 83 so that the distributors 90 and 95 are connected to the cooling/heating units 60A, 60B, and 60C.

Meanwhile, the above-described heat exchangers may have various heat transfer configurations, for example, a heat transfer configuration in which heat transfer is carried out through a thermal conductor, or a heat transfer configuration in which heat transfer is carried out through a fluid present in a heat exchanger, in accordance with the given design condition or the given requirement.

Hereinafter, operation of the cogeneration system according to the present invention will be described.

During a heating operation of the cooling/heating unit 60, a refrigerant flows through the compressor 61, four-way valve 62, indoor heat exchanger 65, expansion device 64, and outdoor heat exchanger 63, in this order, to perform a heating operation.

Meanwhile, electricity, which is generated by a driving force from the engine 50, may be used to operate the compressor 61, indoor fan 66, or outdoor fan 26.

In particular, heat of exhaust gas discharged from the engine 50 during operation of the engine 50 is supplied to a confined space via the exhaust gas heat exchanger 72, heating line 73, and indoor heater 74, thereby directly increasing the temperature of indoor air in the confined space, together with the indoor heat exchanger 65. Thus, the performance of the cogeneration system to heat the confined space is enhanced.

Also, since the indoor heater 74 is arranged downstream from the indoor heat exchanger 65, the indoor heater 74 does not perform direct heat exchange with the refrigerant passing through the indoor heat exchanger 65. Accordingly, it is possible to prevent the refrigerant from being early degraded. In addition, since the indoor heater 74 is directly installed in the confined space such that the indoor heater 74 serves to directly increase the temperature of the confined space without using an additional heat exchanger, the heating performance of the cogeneration system is correspondingly enhanced.

Simultaneously with the above-described heating operation, heat of cooling water used to cool the engine 50 pre-heats the refrigerant passing through the suction side of the compressor 61 while passing through the cooling water heat exchanger 82 and refrigerant pre-heating heat exchanger 84. Accordingly, the temperature of the refrigerant emerging from the compressor 61 is increased, so that the refrigerant emits heat of a higher temperature while passing through the indoor heat exchanger 65, which serves as an evaporator. Thus, an enhancement in the heating efficiency of the cogeneration system is achieved.

Since the refrigerant line 67 is indirectly connected to the cooling water heat exchanger 82 such that the refrigerant line 67 performs heat exchange with the cooling water heat exchanger 82 via the refrigerant pre-heating heat exchanger 84, it is possible to prevent the refrigerant from being over-heated, and thus, rapidly degraded.

Although the cogeneration system of the present invention has been described as using both the heat of exhaust gas and the heat of cooling water through the exhaust heat consuming heating unit 70 and the refrigerant pre-heating unit 80, it may be possible to perform a heating operation, using a selected one of the heat sources, if necessary.

When the cooling/heating unit 60 operates in a cooling mode or stops the cooling/heating operation thereof, it is necessary to prevent heat of exhaust gas and heat of cooling water generated from the engine 50 from being supplied to the cooling/heating unit 60. In this case, accordingly, the valves 69 of the refrigerant line 67 and the valves 76 of the exhaust heat consuming heating unit 70 are operated to change fluid paths associated with the exhaust gas heat and cooling water heat, respectively.

As a result, the refrigerant in the cooling/heating unit 60 flows through the bypass line 68, and the exhaust gas heat exchanging fluid and cooling water flow through the radiating lines 77 and 87, respectively. Thus, the exhaust gas heat and cooling water heat are discharged to the atmosphere or transferred to other waste heat consuming systems, respectively.

As apparent from the above description, the cogeneration system of the present invention can achieve an enhancement in indoor heating efficiency because the cogeneration system includes the indoor heater to heat air blown to the indoor heat exchanger, using waste heat generated from an engine.

Since the indoor heater is arranged downstream from the indoor heat exchanger, the cogeneration system of the present invention also has an effect of preventing the refrigerant of the cooling/heating unit from being rapidly degraded.

In addition, the cogeneration system of the present invention achieves an improvement in heating performance because it is possible to pre-heat the refrigerant passing through the suction side of the compressor, using the waste heat generated from the engine, and thus, to increase the temperature of the temperature.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A cogeneration system comprising:
   an engine, which drives a generator to generate electricity;
   a cooling/heating unit, which comprises at least one compressor, a four-way valve, an outdoor heat exchanger, an expansion device, and an indoor heat exchanger, to establish a heat pump type refrigerant cycle;
   an exhaust heat consuming heating unit to supply heat of exhaust gas discharged from the engine to a heat exchanging zone of the indoor heat exchanger of the cooling/heating unit, and thus, to heat a confined space;
   a cooling water heat exchanger to recover heat of a cooling water passing through the engine during a heating operation of the cooling/heating unit; and
   a refrigerant pre-heating heat exchanger located between the cooling water heat exchanger and a refrigerant line connected to the suction section of the compressor, to transfer the heat recovered by the cooling water heat exchanger to a refrigerant in the refrigerant line at the suction section of the compressor, thereby preventing the refrigerant from being overheated.

2. The cogeneration system according to claim 1, wherein the exhaust heat consuming heating unit comprises:
   an exhaust gas heat exchanger arranged at an exhaust conduit, through which the exhaust gas passes;
   an indoor heater arranged at the heat exchanging zone of the indoor heat exchanger to perform heat exchange with indoor air; and
   a heating line, which connects the exhaust gas heat exchanger and the indoor heater to guide a heat transfer medium to flow between the exhaust gas heat exchanger and the indoor heater.

3. The cogeneration system according to claim 2, wherein the exhaust heat consuming heating unit further comprises:

an exhaust heat radiating unit to radiate heat recovered by the exhaust gas heat exchanger when it is unnecessary to supply heat to the indoor heater.

4. The cogeneration system according to claim 3, wherein the exhaust heat radiating unit comprises:
a radiating line branched from the heating line;
a valve to bypass the heat transfer medium in the heating line through the radiating line; and
a radiator arranged at the radiating line.

5. The cogeneration system according to claim 2, wherein the indoor heater is arranged in parallel with the indoor heat exchanger such that the indoor heater performs the heat exchange with the indoor air in accordance with an operation of an indoor fan.

6. The cogeneration system according to claim 5, wherein the indoor heater is arranged downstream from the indoor heat exchanger with respect to a flowing direction of the indoor air.

7. The cogeneration system according to claim 1, further comprising:
a cooling water line, through which the cooling water of the engine passes, wherein the cooling water heat exchanger recovers the heat of the cooling water in the cooling water line during the heating operation of the cooling/heating operation.

8. The cogeneration system according to claim 7, further comprising:
a cooling water heat radiating unit arranged at the cooling water line to radiate the heat of the cooling water when it is unnecessary to supply heat to the suction side of the compressor.

9. A cogeneration system comprising:
an engine, which drives a generator to generate electricity;
a cooling/heating unit, which comprises at least one compressor, a four-way valve, an outdoor heat exchanger, an expansion device, and an indoor heat exchanger, to establish a heat pump type refrigerant cycle;
an exhaust heat consuming heating unit to supply heat of exhaust gas discharged from the engine to a heat exchanging zone of the indoor heat exchanger of the cooling/heating unit, and thus, to heat a confined space;
a refrigerant pre-heating unit to supply heat of cooling water used to cool the engine to a suction side of the compressor of the cooling/heating unit, and thus, to pre-heat a refrigerant passing through the suction side of the compressor, wherein the refrigerant pre-heating unit comprises:
a cooling water line, through which the cooling water of the engine passes; and
a cooling water heat exchanger to recover heat of the cooling water in the cooling water line, and to transfer the recovered heat to a refrigerant line connected to a suction section of the compressor; and
a refrigerant bypass line branched from the refrigerant line connected to the suction section of the compressor to allow the refrigerant in the refrigerant line to bypass the refrigerant pre-heating unit during a cooling operation of the cooling/heating unit.

10. A cogeneration system comprising:
an engine, which drives a generator to generate electricity;
a cooling/heating unit, which comprises at least one compressor, a four-way valve, an outdoor heat exchanger, an expansion device, and an indoor heat exchanger, to establish a heat pump type refrigerant cycle;
an exhaust heat consuming heating unit to supply heat of exhaust gas discharged from the engine to an indoor heater arranged in parallel with the indoor heat exchanger of the cooling/heating unit, and thus, to heat a confined space;
an indoor fan to blow indoor air to a heat exchanging zone defined between the indoor heat exchanger and the indoor heater such that the indoor heat exchanger and the indoor heater simultaneously perform heat exchange with the indoor air; and
a cooling water heat exchanger to recover heat of a cooling water passing through the engine during a heating operation of the cooling/heating unit without recovering the heat of the cooling water during a cooling operation of the cooling/heating unit, and to transfer the heat of the cooling water to a refrigerant in a refrigerant line at a suction section of the compressor during the heating operation of the cooling/heating unit.

11. The cogeneration system according to claim 10 wherein the exhaust heat consuming heating unit comprises:
an exhaust gas heat exchanger arranged at an exhaust conduit, through which the exhaust gas passes;
the indoor heater, which is arranged at the heat exchanging zone to perform heat exchange with the indoor air; and
a heating line, which connects the exhaust gas heat exchanger and the indoor heater to guide a heat transfer medium to flow between the exhaust gas heat exchanger and the indoor heater.

12. The cogeneration system according to claim 11, wherein the exhaust heat consuming heating unit further comprises:
an exhaust heat radiating unit to radiate heat recovered by the exhaust gas heat exchanger when it is unnecessary to supply heat to the indoor heater.

13. The cogeneration system according to claim 11, wherein the indoor heater is arranged downstream from the indoor heat exchanger with respect to a flowing direction of the indoor air.

14. The cogeneration system according to 10, further comprising:
a cooling water line, through which the cooling water of the engine passes, wherein the cooling water heat exchanger recovers the heat of the cooling water in the cooling water line during the heating operation of the cooling/heating operation.

15. The cogeneration system according to claim 14, further comprising:
a refrigerant pre-heating heat exchanger arranged between the cooling water heat exchanger and the refrigerant line connected to the suction section of the compressor, to indirectly transfer the heat recovered by the cooling water heat exchanger to the refrigerant line at the suction section of the compressor, thereby preventing the refrigerant from being overheated.

16. A cogeneration system comprising:
an engine, which drives a generator to generate electricity;
a cooling/heating unit, which comprises at least one compressor, a four-way valve, an outdoor heat exchanger, an expansion device, and an indoor heat exchanger, to establish a heat pump type refrigerant cycle;
an exhaust heat consuming heating unit to supply heat of exhaust gas discharged from the engine to a heat exchanging zone of the indoor heat exchanger of the cooling/heating unit, and thus, to heat a confined space;
a refrigerant pre-heating unit to supply heat of cooling water used to cool the engine to a suction side of the compressor of the cooling/heating unit, thereby pre-heating a refrigerant passing through the suction side of the compressor; and a refrigerant bypass line branched from a refrigerant line at the suction section of the compressor to allow the refrigerant in the refrigerant line to bypass the refrigerant pre-heating unit during a cooling operation of the cooling/heating unit.

* * * * *